United States Patent [19]

Holthausen et al.

[11] 4,359,026
[45] Nov. 16, 1982

[54] INTERNAL COMBUSTION ENGINE HAVING RODS FOR CONTROLLING TWIST PATTERN IN COMBUSTION AIR SUPPLIED TO VALVE CHAMBERS

[75] Inventors: Dieter Holthausen, Bergisch Gladbach; Klaus Henke, Nuremberg; Hugo Stock; Paul Tholen, both of Bergisch Gladbach, all of Fed. Rep. of Germany

[73] Assignee: Klöckner-Humboldt-Deutz AG, Cologne, Fed. Rep. of Germany

[21] Appl. No.: 135,533

[22] Filed: Apr. 10, 1980

[30] Foreign Application Priority Data

Apr. 12, 1979 [DE] Fed. Rep. of Germany ....... 2914961

[51] Int. Cl.³ .............................................. F02B 31/00
[52] U.S. Cl. ............................ 123/306; 123/188 M; 123/193 H
[58] Field of Search ................... 123/52 M, 52 R, 306, 123/188 M, 193 H, 193 R, 41.69

[56] References Cited

U.S. PATENT DOCUMENTS

| | | | |
|---|---|---|---|
| 3,166,053 | 1/1965 | Fischer et al. | 123/41.69 |
| 4,180,041 | 12/1979 | Miyazaki et al. | 123/188 M |
| 4,207,854 | 6/1980 | Alford et al. | 123/306 |

FOREIGN PATENT DOCUMENTS

| | | | |
|---|---|---|---|
| 1171202 | 5/1964 | Fed. Rep. of Germany | 123/188 R |
| 1576012 | 10/1970 | Fed. Rep. of Germany | 123/188 M |

*Primary Examiner*—Craig R. Feinberg
*Attorney, Agent, or Firm*—Watson, Cole, Grindle & Watson

[57] ABSTRACT

A valve-controlled internal combustion engine has the amount of twist in the combustion air flowing through a curved inlet channel to a valve chamber controlled by a control rod extending across the bottom wall of the inlet channel near the valve chamber and rotatable from outside the engine to change the cross sectional dimensions of the inlet channel and increase or decrease the twist in the flow of combustion air therepast.

6 Claims, 2 Drawing Figures

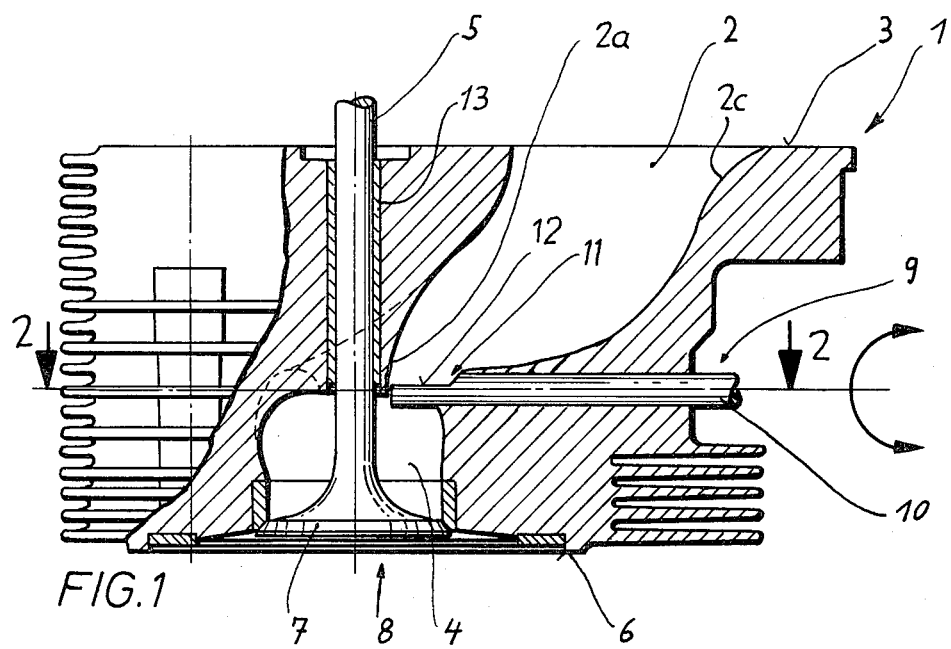
FIG.1
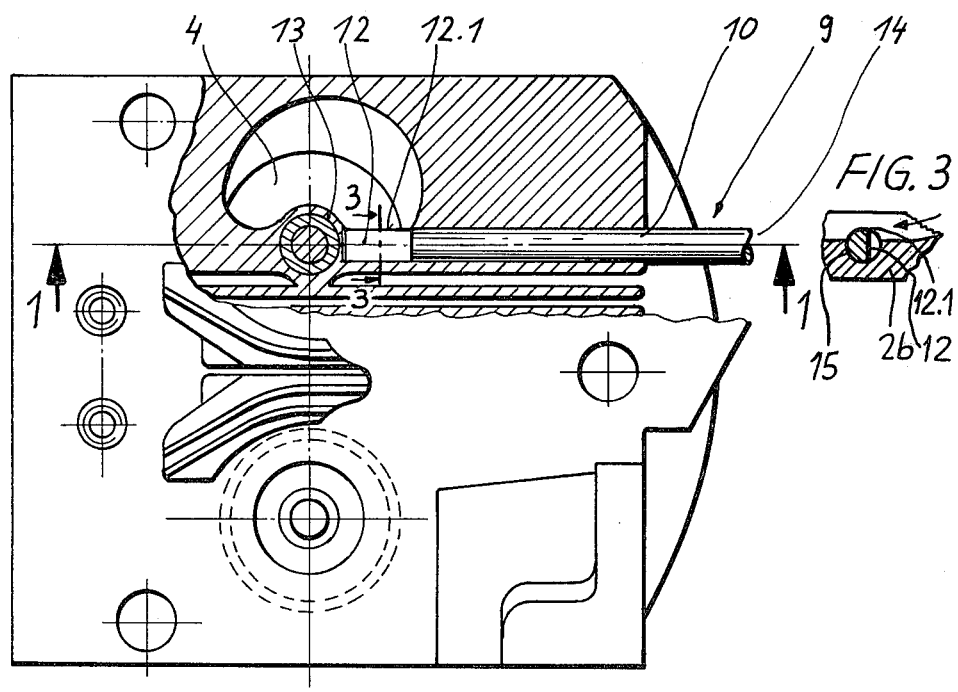
FIG.2
FIG.3

INTERNAL COMBUSTION ENGINE HAVING RODS FOR CONTROLLING TWIST PATTERN IN COMBUSTION AIR SUPPLIED TO VALVE CHAMBERS

BACKGROUND OF THE INVENTION

The present invention relates to valve-controlled internal combustion engines, and more specifically to such engines which include curved air inlet channels that are capable of supplying a flow of combustion air to the internal combustion chambers having a twisting flow pattern.

Internal combustion engines which include curved air inlet channels for supplying combustion air to the internal combustion chambers with a twisting flow pattern, e.g., so as to help decrease pollutent emissions from the engines, are known. However, in such known engines the amount of twist in the air flow will necessarily depend not only on the constructional features and tolerances of the inlet channel, which tolerances will vary even for engines consecutively produced on the same assembly line, but also on the velocity of the air as it flows through the curved inlet channel. Such air velocity will be dependent on various engine operational characteristics such as engine speed (rpm), quantity of fuel injected, timing of fuel injected, etc. Thus, for any given valve-controlled internal combustion engine as the engine operational characteristics change, the amount of twist in the combustion air flowing through the inlet channels will change and, since such changes will necessarily cause deviations in the twist amount from the optimum level, increased engine pollution emissions.

It is an object of the present invention to provide a valve-controlled internal combustion engine of the type which includes curved air inlet channels which will include a means for controlling the amount of twist in the combustion air flowing through the inlet channels and thus allow the optimum amount of twist to be present in the combustion air as it enters the valve chambers, i.e., regardless of the specific constructional details of the individual engine and/or regardless of the particular momentary operational characteristics of the functioning engine.

SUMMARY OF THE INVENTION

According to the present invention an adjustable control element is positionable in each curved air inlet channel which supplies combustion air to a valve chamber in a valve-operated internal combustion engine, and each adjustable control element is capable of extending into the curved inlet chamber to change its cross sectional dimensions and concurrently both change the velocity of the air flowing therepast and the amount of twist in the flow stream itself. The adjustable control element will be variably effective on the combustion air flow stream from a position in which it will have no effect thereon (this being the desired position when for example, the engine is operating at its optimum conditions and the combustion air flowing through the curved inlet channel will have the optimum amount of twist therein) to a position in which it will have a maximum effect (this being the desired position when, for example, the engine is operating at a very slow speed and the combustion air flowing through the curved inlet channel will develop only a low amount of twist.

More specifically, the adjustable control element will be externally controllable with respect to its effect on the combustion air flow in the curved inlet channel and it will be preferably positioned in the curved inlet channel adjacent the intersection point between the curved inlet channel and the valve chamber, this point being known as the nozzle area. Thus the effect of the control element on the combustion air will be accomplished immediately prior to the combustion air entering the valve chamber. The adjustable control element can be operated either by human or mechanical means, and when operated by mechanical means the mechanism can be constructed so as to adjust the operation of the control element based on one or more of the operational characteristics of the engine.

In one form of the invention, each control element will be insertable through a bore formed in the engine to extend from the outside of the engine to the curved air inlet channel, and when inserted in the bore the control element will be adjustable to change the cross sectional dimensions of curved inlet channel. Each control element will preferably be in the form of an elongated cylindrical rod and each bore will extend as a linear cylindrically-shaped passageway from the outside of the engine to an outer side wall of the curved inlet channel and then continue along a bottom wall of the inlet channel in the form of a linear groove to end at the inner side wall of the curved inlet channel.

In one preferred embodiment of the present invention the valve-controlled internal combustion engine will include a cylinder head portion which includes therein at least one valve chamber (with a valve reciprocatingly movable therein to provide communication with an associated combustion chamber in another portion of the engine), a curved air inlet channel for supplying combustion air having a twisting flow pattern to each valve chamber, a linear cylindrically-shaped bore which extends from the outside of the cylinder head to communicate with the outer side wall of each curved inlet channel and extend along the bottom wall of the inlet channel up to the inner side wall near the nozzle area as a groove having a cross section comprised of a portion of a circle, this groove being oriented perpendicularly to the combustion air flow therepast, and an elongated cylindrical control rod extending in a slidable fashion through each bore and capable of abutting against the innerside wall forming the curved inlet channel, the elongated cylindrical control rod being rotatable within the bore so that the end thereof located in the groove portion can variably modify the cross sectional dimensions of the inlet channel.

In this preferred embodiment the end of the control rod which is positionable in the groove portion of the bore will include a flattened portion having a length equal to the length of the groove portion (thus being equal to the width of the bottom wall of the inlet channel at this location), and the cylindrical rod will be sufficiently long that the opposite end will extend beyond the cylinder head portion when the tip of the end having the flattened portion is positioned to abut against the inner wall of the inlet chamber. This noted opposite end of the control rod will include means to allow the cylindrical rod to be rotated within the bore in which it extends, and such rotation will cause the flattened portion at the end which extends in the groove in the inlet channel bottom wall to extend to a varying degree upwardly from the bottom wall and into the air flowing through the curved inlet channel, thus variably changing the cross sectional dimensions of the channel. The air flowing therepast will not only be speeded up, but the amount of twist in the flow will be increased by deflection of air off the flattened surface.

The use of the noted control rods will thus allow for the proper amount of twist in the combustion air flowing through the curved inlet channel of a valve-controlled internal combustion engine regardless of its particular manufacturing characteristics and in response to the engine's momentary operational characteristics. Furthermore, the control rods can be easily removed from the engine for reshaping or replacement if they should become worn or damaged. Also, the ability to insert rods having somewhat differently-shaped ends into the groove in the bottom wall of the curved inlet channel, and to different extents, will allow standard engines to be used in different applications (e.g. convert a standard engine to a supercharged engine) or for the cylinder head portions to be useful on engines having different cylinder bores. In each instance the optimum adjustments in the twist pattern in the combustion air flowing through the curved inlet channels can be easily and successfully achieved.

Further objects, features and characteristics of the present invention will be appreciated from a review of the following description taken in conjunction with the accompanying drawing.

BRIEF DESCRIPTION OF THE DRAWING

In the drawing,

FIG. 1 depicts a schematic side view, partially cut away, of an air-cooled cylinder head portion of a valve-controlled internal combustion engine constructed in accordance with the present invention, the view being taken along line 1—1 of FIG. 2 so as to show part of the curved inlet channel for communicating combustion air to the internal valve chamber;

FIG. 2 depicts a partially cut away top view of the cylinder head of the present invention, the view being taken along line 2—2 of FIG. 1 at the level of the air flow control element; and FIG. 3 shows a sectional view of the control element taken along line 3—3 of FIG. 2.

DETAILED DESCRIPTION OF THE PREFERRED EMBODIMENT

An air-cooled cylinder head portion 1 of a valve-controlled internal combustion engine constructed in accordance with the present invention is shown in FIG. 1 to include a combustion chamber inlet valve 8 composed of a head 7 mounted on an elongated valve shaft 5, the valve shaft 5 being movable within a guiding core 13 positioned within the cylinder head 1 so as to cause the head 7 to suitably open and close the opening in the bottom surface 6 of the cylinder head 1 leading into a combustion chamber of the internal combustion engine (not shown). The cylinder head 1 also includes a valve chamber 4 which extends upwardly from the bottom surface 6 of the cylinder head and concentrically around the valve shaft 5, as well as a curved inlet channel 2 which communicates downwardly between the top surface 3 of the cylinder head and the valve chamber 4, the inlet channel 2 being shaped so that combustion air will be caused to flow in a twisting fashion around the axis of the valve shaft 5 (which also represents the axis of the piston located in the combustion chamber (not shown)) as it moves from the cylinder head top surface 3 to the valve chamber 4.

Also included in the cylinder head 1 is a bore through which slidingly extends an adjustable air flow control element 9. As can be seen from FIGS. 1 and 2, this bore is oriented to extend in a parallel fashion to the bottom surface 6 of the cylinder head 1, and as can be determined from a review of all the Figures, this bore will include a groove portion 15 extending across the bottom wall 2b of the inlet channel between the inner wall 2a and the outer wall 2c, the groove terminating at the inner wall 2a and extending perpendicularly to the flow of combustion air therepast. In addition, the groove 15 is located in the bottom wall 2b of the inlet channel adjacent the nozzle area formed at the point where the inlet channel 2 joins with the valve chamber 4. The groove 15 will have a cross section which represents a portion of a circle, e.g., a semicircle.

The control element 9 is seen to comprise an elongated cylindrical rod 10 which is sufficiently long that one end 11 is capable of extending across the groove 15 in the bottom wall 2b such that the tip of the end 11 can abut against the inside wall 2a of the inlet channel 2 while the opposite end 14 will extend outwardly beyond the side of the cylinder head. The end 14 may include grooves and/or ridges (not shown) so as to allow the cylindrical rod to be gripped and rotated as desired.

The end 11 of the cylindrical rod 10 is formed to include a flattened surface portion 12 which will have a length along the cylindrical rod at least equal to the width across the inlet channel 2, and it is the end 11 of the cylindrical which will be positionable in the curved groove 15 in the floor side 2b of the inlet channel and, in effect, be sealed thereagainst.

In the situation depicted in FIGS. 1, 2 and 3, the cylindrical bar 10 has not only been slidingly inserted into the cylinder head 1 such that the tip of end 11 is in abutting relationship with the inside surface 2a of the inlet channel 2, but also rotated such that one side 12.1 of the flattened surface portion 12 extends into the air flow area in the inlet channel adjacent the nozzle zone sufficiently that the effective cross section of the inlet channel is changed and the flowing combustion air is partially deflected off portion 12 such that its twist characteristics as it enters valve chamber 4 are increased. Thus, suitable control of the twisting of the combustion air inflow to valve chamber 4, as well as its inflow speed, can be achieved by changes in both the degree of insertion of end 11 of the cylindrical rod across the inlet channel 2 and its rotational orientation within groove 15.

Since it is important that the control element be retained in its positioning, i.e., once it has been inserted into the cylinder head 1 sufficiently that the end 11 extends along the groove 15 to the desired degree and also once it has been rotated such that the side 12.1 of the flattened portion 12 extends into the combustion air flow stream as desired, the cylindrical bar 10 can be constructed so as to reasonably tightly fit within the bore in which it is positioned, or else the end 14 can be fitted with counternuts (not shown) which can be tightened therearound and against the side of the cylinder head 1.

The end 14 of the cylinder bar 10, which as noted may include grooves and/or ridges for gripping and rotation thereof, can be gripped and rotated either manually, e.g., by the use of a wrench or a suitable lever, or by a mechanical device (not shown) which be be constructed to automatically determine the positioning and orientation of the cylindrical bar 10 within the cylinder head 1. Such a mechanical device can be electrically, hydraulically or pneumatically operated so as to adjust the insertion and rotational orientation of the control rod based on the engine operating characteristics such as engine speed (rpm), quantity of injected fuel into the combustion chamber, timingly of injected fuel into the combustion chamber, etc.

It should be noted that use of the inventive control element 9 is not limited to application in an air-cooled cylinder head of an internal combustion engine, or to such an air-cooled cylinder head as depicted in FIGS. 1 and 2. Instead, they can be used in conjunction with any type of inlet channel through which combustion air flows to a combustion chamber of a valve operated internal combustion engine in a desirably twisting fashion. Likewise, it is not important whether the engine operates by sucking of the combustion air through the inlet channel into the combustion chamber or else by employing a separate blower to force the combustion air through the curved inlet channel and ultimately into the combustion chamber.

Further variations in the invention will be apparent to those of ordinary skill in this art and should be considered to fall within the scope of the invention a defined in the following claims.

We claim:

1. A valve-controlled internal combustion engine which includes a cylinder head portion, said cylinder head portion including a valve chamber; a combustion air inlet channel which communicates with said valve chamber to deliver combustion air thereto, said combustion air inlet channel being formed by an inner wall, an outside wall and a bottom wall, a nozzle area being formed where the combustion air flows past said bottom wall into said valve chamber; and a bore which extends along an axis through said cylinder head portion to directly communicate with said outside wall of said combustion air inlet channel at a point adjacent said bottom wall; and a cylindrical bar which extends in and along said bore in said cylinder head portion, said cylindrical bar being sufficiently elongated to be extendable from said outside wall of said combustion air inlet channel and sealingly along said bottom wall to abut said inner wall, said cylindrical bar being rotatable about its axis and slidingly movable along the axis of said bore to be adjustably positioned within said combustion air inlet channel and having means to affect the degree of twist in the combustion air flowing perpendicularly therepast and through said nozzle area into said valve chamber baised on its degree of insertion into said combustion air inlet and its rotational orientation.

2. The engine of claim 1 wherein said cylindrical bar includes a first end which is positionable in said combustion air inlet channel and wherein said first end includes a flattened portion which constitutes said combustion air twisting means.

3. The engine of claim 2 wherein said cylindrical bar includes a second end opposite said first, and wherein said second end includes means to allow said cylindrical bar to be rotated.

4. The engine of claim 2 wherein said bore includes a linear groove portion in said bottom wall, and wherein said cylindrical bar extends through said bore and within said groove portion so that its first end can abut against said inside wall and wherein rotation of said cylindrical bar will cause one side of said flattened portion to extend upwardly into said inlet channel and both change to cross sectional dimensions of said inlet channel and deflect air from its surface, thereby changing the velocity and the amount of twist in the air flow passing thereby.

5. The engine of claim 4 wherein said linear groove in said bottom wall has a cross section formed as a portion of a circle.

6. The engine of claim 5 wherein said cross section is a semicircle.

* * * * *